United States Patent
Pieper et al.

(10) Patent No.: US 12,526,529 B2
(45) Date of Patent: Jan. 13, 2026

(54) IMAGE DATA CAPTURE FOR IN-CABIN SYSTEMS AND APPLICATIONS USING VISIBLE AND INFRARED LIGHT SENSORS

(71) Applicant: NVIDIA Corporation, Santa Clara, CA (US)

(72) Inventors: Sean Midthun Pieper, Waldport, OR (US); Robin Brian Jenkin, Morgan Hill, CA (US); Haifeng Li, Santa Clara, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 7 days.

(21) Appl. No.: 18/296,927

(22) Filed: Apr. 6, 2023

(65) Prior Publication Data

US 2023/0336875 A1   Oct. 19, 2023

Related U.S. Application Data

(60) Provisional application No. 63/331,779, filed on Apr. 15, 2022.

(51) Int. Cl.
| | |
|---|---|
| *H04N 23/73* | (2023.01) |
| *G02B 5/20* | (2006.01) |
| *G06V 10/143* | (2022.01) |
| *H04N 23/11* | (2023.01) |
| *H04N 23/74* | (2023.01) |

(52) U.S. Cl.
CPC ............ *H04N 23/73* (2023.01); *G02B 5/20* (2013.01); *G06V 10/143* (2022.01); *H04N 23/11* (2023.01); *H04N 23/74* (2023.01)

(58) Field of Classification Search
CPC ........ H04N 23/73; H04N 23/11; H04N 23/74; H04N 23/12; H04N 23/75; H04N 23/76; G02B 5/20; G06V 10/143; G06V 10/20; G06F 18/256
See application file for complete search history.

(56) References Cited

U.S. PATENT DOCUMENTS

| | | | |
|---|---|---|---|
| 9,307,156 B1* | 4/2016 | Sinfield | H04N 23/23 |
| 2002/0003583 A1* | 1/2002 | Arai | H04N 23/75 |
| | | | 348/E5.04 |
| 2013/0027778 A1* | 1/2013 | Currie | B82Y 20/00 |
| | | | 977/734 |
| 2018/0041718 A1* | 2/2018 | Price | G01S 7/4816 |
| 2018/0295336 A1* | 10/2018 | Chen | H04N 25/131 |

(Continued)

*Primary Examiner* — Hung H Lam
(74) *Attorney, Agent, or Firm* — Lowenstein Sandler LLP

(57) ABSTRACT

Apparatuses, systems, and techniques for reliable image data capture are disclosed herein. A system includes a sensor configured to receive light reflected off one or more objects in an environment. The sensor includes a first set of sensor pixels configured to detect a portion of the received light having wavelengths in the visible light spectrum. The sensor further includes a second set of sensor pixels configured to detect an additional portion of the received light having wavelengths in an infrared spectrum. The system further includes a filter component configured to reduce an intensity of the portion of the received light detected by the first set of sensor pixels while maintaining at least a minimum intensity of the additional portion of the received light detected by the second set of sensor pixels.

20 Claims, 15 Drawing Sheets

(56) References Cited

U.S. PATENT DOCUMENTS

| | | | |
|---|---|---|---|
| 2019/0068929 A1* | 2/2019 | Sato | H04N 25/133 |
| 2020/0082160 A1* | 3/2020 | Li | G06F 18/251 |
| 2021/0044763 A1* | 2/2021 | Sun | H04N 23/54 |
| 2021/0314501 A1* | 10/2021 | Chen | H04N 23/667 |
| 2022/0046194 A1* | 2/2022 | Zhang | H04N 13/106 |
| 2022/0392182 A1* | 12/2022 | Tu | H04N 25/131 |
| 2023/0328386 A1* | 10/2023 | Tang | H04N 23/651 |
| | | | 348/164 |

* cited by examiner

500

Obtain first image data depicting one or more objects in an environment, the first image data generated based on light received by a first set of sensor pixels 510

Obtain second image data depicting one or more objects in the environment, the second image data generated based on light received by a second set of sensor pixels 512

Modify one or more settings associated with a sensor to increase an exposure time associated with the first set of sensor pixels from a first exposure time to a second exposure time based on the obtained first image data and the obtained second image data 514

FIG. 5

IMAGE DATA CAPTURE FOR IN-CABIN SYSTEMS AND APPLICATIONS USING VISIBLE AND INFRARED LIGHT SENSORS

RELATED APPLICATIONS

This application is related to and claims the benefit of U.S. Provisional Patent Application No. 63/331,799, filed Apr. 15, 2022 titled "Reliably Capturing RGB and Infrared Images Simultaneously," the entirety of which is incorporated herein by reference.

TECHNICAL FIELD

At least one embodiment pertains to systems and methods for image data capture for in-cabin systems and applications using visible and infrared light sensors. For example, a system can include one or more sensors configured to receive light reflected off one or more objects in an environment. A first set of sensor pixels (e.g., red-green-blue (RGB) pixels, etc.) of the sensor can detect a portion of the received light having wavelengths in the visible light spectrum and a second set of sensor pixels (e.g., infrared (IR) pixels) can detect a portion of the received light having wavelengths in the IR spectrum. One or more components of the sensor can reduce the intensity of the portion of the received light detected by the first set of sensor pixels while maintaining at least a minimum intensity of the additional portion of the received light detected by the second set of sensor pixels.

BACKGROUND

Camera systems can include different types of sensors to generate different types of images of a subject or environment. For example, an in-camera monitoring camera system (e.g., for an automobile) can include a red-green-blue (RGB) sensor that detects light having wavelengths in the visible light spectrum (e.g., wavelengths of approximately 380-700 nanometers (nm)) and an infrared (IR) sensor that detects light having wavelengths in the IR light spectrum (e.g., wavelengths of approximately 700-1000 nm, or higher). Data collected by the RGB sensor can be used to generate images for occupant monitoring, or infotainment and telepresence applications, while data collected by the IR sensor can be used for a variety of machine and computer vision applications (e.g., driver identification or monitoring, occupant identification or monitoring, gesture recognition, gaze detection, etc.). It can be difficult to obtain reliable color image data and IR image data due to conflicting constraints on exposure control for the RGB and IR sensors.

BRIEF DESCRIPTION OF DRAWINGS

Various embodiments in accordance with the present disclosure will be described with reference to the drawings, in which:

FIG. 5 illustrates example transmission data, according to at least one embodiment;

DETAILED DESCRIPTION

Figure 1:
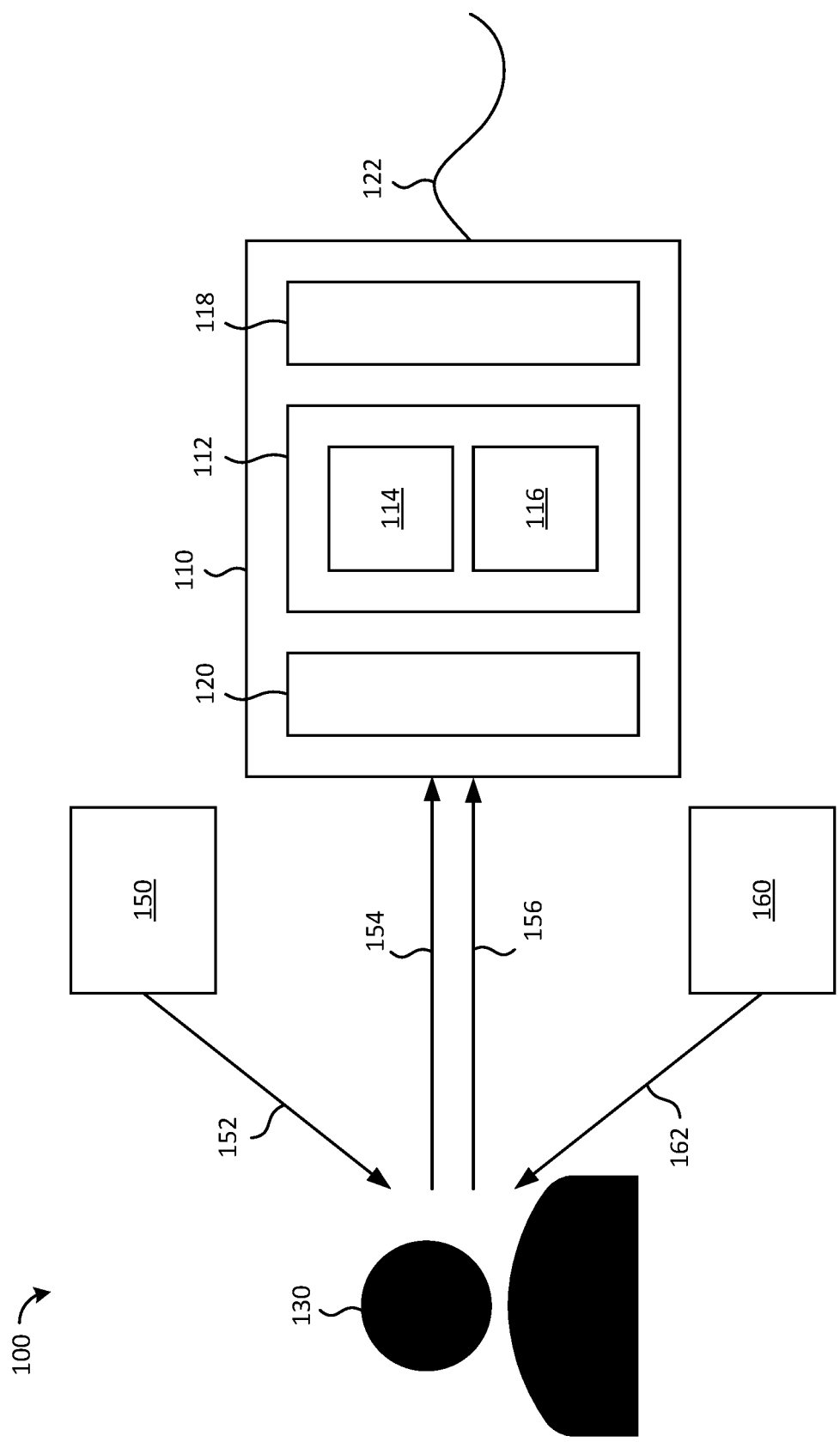
FIG. 1 is a block diagram of an example system architecture, according to at least one embodiment.

Camera systems can include sensors that collect data used to generate different types of images. For example, camera systems for automotive in-cabin monitoring can include a red-green-blue (RGB) sensor that detects light having wavelengths in the visible light spectrum (e.g., wavelengths of approximately 380-700 nanometers (nm)) and an infrared (IR) sensor that detects light having wavelengths in the IR light spectrum (e.g., wavelengths of approximately 700-1000 nm, or higher). Data collected by the RGB sensor can be used to generate images for infotainment and telepresence applications and/or occupant monitoring applications, while data collected by the IR sensor can be used for a variety of machine and computer vision applications (e.g., driver identification or monitoring, occupant identification or monitoring, gesture recognition, gaze detection, etc.).

Some camera systems can include sensors that have both RGB sensor pixels (e.g., configured to detect light in the visible spectrum) and IR sensor pixels (e.g., configured to detect light in the IR spectrum). Such sensors are referred to as RGB-IR sensors herein. Including an RGB-IR sensor in a camera system can have several benefits over including both discrete, individual RGB and IR sensors. For example, an integrated RGB-IR sensor can occupy a smaller amount of space in the camera system than both discrete RGB and IR sensors. In another example, it can be more cost efficient to include an RGB-IR sensor in a camera system than including both an RGB sensor and an IR sensor.

Data generated by RGB-IR sensors can be processed to simultaneously generate RGB and IR image data. However, reliable RGB and IR image data may not be consistently available due to different operating conditions for the RGB and the IR sensor pixels. For example, a longer exposure time (e.g., time that the sensor is exposed to light) may be needed for the IR sensor pixels to detect light in the IR spectrum than for the RGB sensor pixels to detect light in the visible spectrum. If the longer exposure time is not provided, the RGB-IR sensor may not consistently generate reliable IR image data. However, the longer exposure time needed for the IR sensor pixels to detect the light in the IR spectrum may be too long for the RGB sensor pixels, which can cause overexposure of the RGB sensor pixels, leading to loss of information in RGB image data collected by the RGB-IR sensor.

Some camera systems with imaging devices including RGB-IR sensors operate the RGB-IR sensors in a two-context mode where an exposure setting for the sensor is alternated between a long exposure setting and a short exposure setting for each image frame generated by the imaging device. However, alternating between the long exposure setting and the short exposure setting on a per frame basis is computationally intensive, which can reduce the number of resources (e.g., processing cycles, memory space, power, etc.) available to the imaging device and/or the system that includes the imaging device. Further, such techniques cannot be integrated in a wide range of sensors, as not all sensors can support a multi-context mode. Other camera systems can increase power provided to an IR emitter directed to a subject or environment captured by the imaging device, to attempt to increase the intensity of IR light illuminated from the IR emitter to better match daylight. Such techniques have limited applications and may not be safe for inclusion in an automotive application, as increased IR power and IR light intensity can cause driver discomfort and violate vehicle safety standards. Yet other camera systems integrate high dynamic range sensors (e.g., sensors capable of 120 dB of single exposure) in an imaging device. However, such high dynamic range sensors cannot be integrated with a global shutter (e.g., a shutter that enables all pixels of the sensor to be exposed to light simultaneously). Without a global shutter, IR light emitted by an IR emitter cannot be strobed or pulsed (e.g., as required by vehicle safety standards). Accordingly, conventional systems fail to offer techniques for increasing an exposure time of light to a sensor having both visible light pixels (e.g., RGB pixels) and IR pixels so to generate accurate IR image data while reducing the intensity of the light detected by the visible light pixels, in accordance with performance conditions and safety requirements for the system.

Embodiments of the present disclosure address the above and other deficiencies by providing techniques for reliably capturing multiple types of image data (e.g., RGB image data, IR image data, etc.) simultaneously in a camera system. An imaging device can include one or more sensors, in some embodiments. At least one of the one or more sensors can be configured to receive light reflected off one or more objects in an environment. In an illustrative example, a sensor can be a component of an automotive in-cabin monitoring camera system and the sensor can be positioned to receive light off one or more occupants of an automobile, one or more objects (e.g., a steering wheel, seatbelts, etc.) in the automobile, and/or an environment of the automobile. The sensor can include a first set of sensor pixels that are configured to detect a portion of light having wavelengths in a visible light spectrum (referred to simply as visible light). In some embodiments, the first set of sensor pixels can include RGB pixels. In additional or alternative embodiments, the first set of sensor pixels can include other pixels configured to detect visible light (e.g., pixels of a red-green-blue-white (RGBW) array, a cyan-yellow-green-magenta (CYGM) array, a red-clear-green (RCG) array, an IR-clear (IRC) array, an IR-monochrome array, a red-clear-blue (RCB) array, a red-yellow-blue (RYB) array, etc.). Pixels of the first set of sensor pixels are referred to herein as visible light pixels or color pixels herein. The second set of sensor pixels can be configured to detect a portion of light having wavelengths in an IR light spectrum (referred to simply as IR light). Pixels of the second set of sensor pixels are referred to herein as IR pixels.

In some embodiments, a filter component can be configured to reduce an intensity of visible light detected by the first set of sensor pixels while at least maintaining (e.g., without reducing) an intensity of IR light detected by the second set of sensor pixels. The filter component can include a neutral density filter and/or a vario-tint filter, in some embodiments. In some embodiments, the imaging device including the sensors can include one or more camera lenses. The filter component can include a coating applied to at least one of the one or more camera lenses, in some embodiments. In additional or alternative embodiments, at least one of the one or more camera lenses can be composed of a material that provides filtering effects offered by a neutral density filter and/or a vario-tint filter (e.g., the camera lens itself is the filter component). In yet additional or alternative embodiments, the filter component can be applied as a coating on or can include a cover glass that is disposed on top of the one or more camera lenses.

In additional or alternative embodiments, the first set of sensor pixels and/or the second set of pixels can be fabricated and/or modified to provide the same or a similar effect as the filter component. For example, in some embodiments, the first set of sensor pixels can be electrically desensitized to reduce the impact of a longer exposure time on the first set of sensor pixels. In another example, darker color filter array dyes could be used to fabricate the first set of sensor pixels than are used for other types of sensors that detect visible light. In yet another example, the second set of sensor pixels can be fabricated and/or modified to have a higher conversion gain (e.g., a measure of a change in output voltage with the absorption of one charge) than a conversion gain of the first set of pixels. In yet another example, the second set of pixels can be associated with a different analog gain (e.g., a variable gain amplifier that boosts the voltage output of photodetectors of the imaging device) than an analog gain of the first set of sensor pixels.

An IR emitter can be configured to illuminate IR light towards the one or more objects of the environment, in some embodiments. The IR emitter can be configured to increase an intensity of IR light illuminated towards the objects (e.g., in addition to the IR light already illuminated another light source, such as the sun, etc.). In some embodiments, a controller for the imaging device can increase an exposure time for the sensor based on the intensity of the IR light illuminated towards the objects. The increased exposure time for the sensor can be sufficient for the IR sensor pixels to detect light in the IR spectrum and therefore enable the sensor to generate accurate IR image data depicting the objects in the environment. However, the filter component and/or the design considerations for the first set of pixels reduces the intensity of visible light detected by the first set pixels, preventing overexposure of the first set of pixels. Accordingly, the sensor is enabled to generate accurate visible light image data depicting the objects in the environment.

Aspects and embodiments of the present disclosure provide techniques to increase an exposure time of light to a sensor having both visible light pixels (e.g., RGB pixels) and IR pixels so as to generate accurate IR image data while reducing the intensity of the light detected by the visible light pixels, thus enabling an imaging device including the sensor to generate accurate visible light image data. As indicated above, the filter component and/or the design considerations for the visible light pixels can reduce the intensity of visible light detected by the visible light pixels, which can prevent overexposure of the visible light pixels while the increased exposure time by the controller allows for increased intensity of IR light received by the IR pixels. Accordingly, accurate visible light image data and IR image data can be reliably generated by the imaging device, and such accurate image data can be used for both improved infotainment and telepresence applications and improved machine and computer vision applications. Further, embodiments of the present disclosure can provide for the reliable capture of visible light image data and IR image data without frequent image device setting switching and/or increased IR power and IR light intensity, which minimizes the number of computing resources (e.g., processing cycles, memory space, power, etc.) consumed to generate the image data while also satisfying system safety standards (e.g., vehicle safety standards).

FIG. 1 is a block diagram of an example system architecture 100, according to at least one embodiment. The system architecture 100 (also referred to as "system" herein) includes an imaging device 110, which includes a sensor 112 and a controller 118, in some embodiments. Imaging device 110 can be configured to generate image data associated with an environment and/or one or more objects or subjects in the environment. Imaging device 110 can be or can otherwise include any type of mechanical, digital, electronic, etc. device that is capable of generating image data. In some embodiments, imaging device 110 can be or can otherwise include a camera, or one or more components of a camera. For purposes of example and illustration only, embodiments of the present disclosure are described with or relate to generating image data with respect to subject 130. However, imaging device 110 can be configured to generate image data associated with any environment and/or any objects or subjects, and any number of objects or subjects, in accordance with embodiments of the present disclosure.

In some embodiments, system 100 can include a light source 150 that provides light energy 152 to one or more objects and/or subjects (e.g., subject 130) of an environment. Light energy 152 can be made up of light having wavelengths across one or more classes of the electromagnetic spectrum. In some embodiments, light energy 152 provided by light source 150 include light having wavelengths in the visible light spectrum (e.g., wavelengths of approximately 380-700 nm). In additional or alternative embodiments, light energy provided by light source 150 can include light having wavelengths in the infrared (IR) light spectrum (e.g., wavelengths of approximately 700-1000 nm, or higher). In yet other or similar embodiments, light energy provided by light source 150 can include light having wavelengths in other spectrums or other classes of the electromagnetic spectrum (e.g., the ultraviolet light spectrum, etc.). In some embodiments, light source 150 can be or otherwise include a natural light source (e.g., the Sun). Light source 150 can be or otherwise include an artificial light source (e.g., an incandescent light source, a luminescent light source, etc.).

As indicated above, light source 150 can provide light energy 152 to one or more objects and/or subjects (e.g., subject 130) in an environment. At least a portion of the light energy 152 can be reflected off the objects and/or the subjects in the environment. At least a portion of the reflected light energy can be received by imaging device 110. In some embodiments, one or more portions of the reflected light energy can include wavelengths in the visible light spectrum. Such portions are annotated as reflected light 154 of FIG. 1. In additional or alternative embodiments, one or more portions of the reflected light energy can include wavelengths in the IR light spectrum. Such portions are annotated as reflected light 156 of FIG. 1. It should be noted that other types of light can be reflected off the objects and/or subjects in the environment and received by imaging device 110, in accordance with embodiments of the present disclosure. It should also be noted that one or more portions of reflected light energy may not be received by imaging device 110.

In some embodiments, system 100 can include an IR light transmitter 160. IR light transmitter 160 can transmit IR light 162 towards an object and/or subject (e.g., subject 130) in an environment. At least a portion of the IR light 162 can be reflected off a surface of the object and/or the subject. In some embodiments, at least a portion of the reflected IR light can be received by imaging device 110, as described above. The reflected portion of IR light can be combined with reflected IR light 156, in some embodiments. The IR light transmitter 160 can transmit the IR light 162 towards the object and/or the subject to increase an overall intensity of IR light received by imaging device 110. The intensity of the IR light 162 transmitted toward the object and/or the subject and/or the power supplied to the IR light transmitter 160 can be below a threshold amount of light (e.g., as defined by a safety standard associated with system 100), in some embodiments.

In some embodiments, reflected light 154 and/or reflected light 156 can be received by sensor 112 of imaging device 110. Sensor 112 can include one or more sets of pixels that can be configured to receive wavelengths of light within a particular range. For example, sensor 112 can include a first set of pixels 114 that is configured to receive wavelengths of visible light (e.g., wavelengths of approximately 308-700). Sensor 112 can also include a second set of pixels 116 that is configured to receive wavelengths of IR light (e.g., wavelengths of approximately 700 nm-1000 nm, or higher). The first set of pixels 114 can include one or more visible light pixels or color pixels fabricated in an array structure, in some embodiments. In some embodiments, the first set of pixels 114 can include one or more of a red-green-blue (RGB) pixel array, a red-green-blue-white (RGBW) array, a cyan-yellow-green-magenta (CYGM) array, a red-clear-green (RCG) array, an IR-clear (IRC) array, an IR-monochrome array, a red-clear-blue (RCB) array, a red-yellow-blue (RYB) array, and so forth. The second set of pixels 116 can include one or more IR pixels fabricated in the array structure. Further details about the array structure of the first set of pixels 114 and the second set of pixels 116 are provided with respect to FIG. 2.

Figure 2:
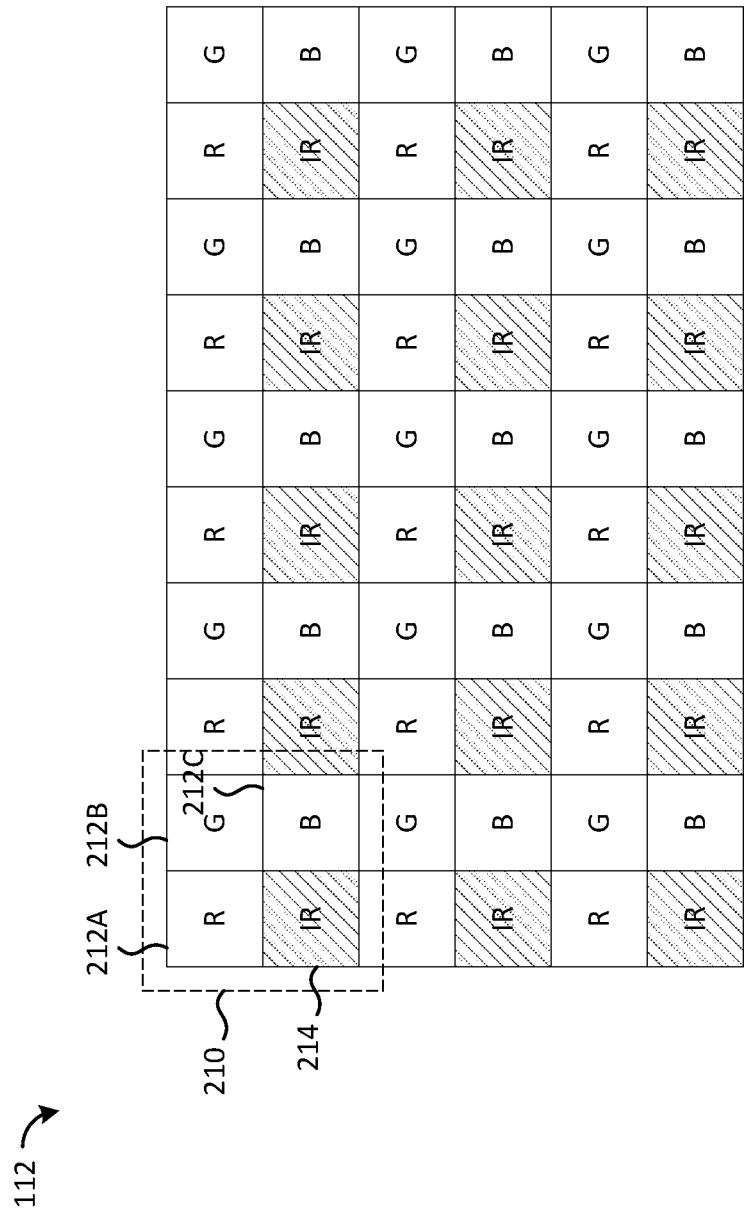
FIG. 2 depicts an example pixel arrangement for a sensor of an imaging device, according to at least one embodiment.

FIG. 2 depicts an example pixel arrangement for a sensor 112 of an imaging device 110, according to at least one embodiment. In some embodiments, sensor 112 can be configured to capture image data based on wavelengths of different types of light (e.g., visible light, IR light, etc.). For example, sensor 112 can include a first set of pixels, such as the first set of pixels 114, that is configured to capture image data based on wavelengths of visible light. Sensor 112 can additionally or alternatively include a second set of pixels, such as the second set of pixels 116, that is configured to capture image data based on wavelengths of IR light. For purposes of example and illustration only, the first set of pixels 114 are described as RGB pixels. It should be noted that the first set of pixels 114 can include any other type of visible light pixels, in accordance with embodiments of the present disclosure.

In an illustrative example, sensor 112 can be or can otherwise include an RGB-IR sensor that obtains color image data of visible light through R (red) pixels 212A, G (green) pixels 212B, and B (blue) pixels 212C and also obtains IR image data of IR light through IR pixels 214. In some embodiments, a single RGB-IR sensor segment 210 can include at least one of an R pixel 212A, a G pixel 212B, and/or a B pixel 212C, as illustrated in FIG. 2. Each segment 210 of the RGB-IR sensor can be repeated in equivalent intervals, in some embodiments. As illustrated in FIG. 2, the segments of the RGB-IR sensor are repeated in a grid-like (also referred to as a chessboard) structure. It should be noted that other configurations of the RGB-IR sensor are possible, in accordance with embodiments of the present disclosure.

Referring back to FIG. 1, controller 118 can generate images of an environment and/or objects or subjects (e.g., subject 130) in an environment based on image data collected by pixels of sensor 112. Controller 118 can include one or more processing units (e.g., an image signal processor (ISP), a digital signal processor (DSP), a graphical processing unit (GPU), a central processing unit (CPU), a data processing unit (DPU, a field programmable gate array (FPGA), an application-specific integrated circuit (ASIC), another integrated circuit, and/or a combination thereof) and/or a memory (e.g., a volatile memory, a non-volatile memory, etc.). Controller 118 can be configured to receive image data from sensor 112 as analog signals, digital signals, etc., or a combination thereof, and generate images based on the received image data.

The image data can include or otherwise correspond to a set of values from the first set of pixels 114 and/or the second set of pixels 116. The set of values may have a size (e.g., a set size), and each value of the set may have a size (e.g., a pixel size). The set size can correspond to a resolution of the image and can be measured by a quantity of pixels. In some embodiments, the set size can correspond to a resolution of 720×480 (e.g., Standard-Definition (SD)), 1920×1800 (High Definition (HD)), 3840×2160 (Ultra High Definition (4K UHD)), 7680×4320 (8K UHD), or another size or ratio of pixels. The value size or pixel size may have a range (e.g., a pixel value range) that indicates or otherwise corresponds to a number of bits. In an illustrative example, the value size can be 8 bits (e.g., range of (0-255), 10 bits (e.g., range 0-1023), 12 bits (e.g., range 0-4K), other number of bits, or a combination thereof. The value size (e.g., pixel size) may be related to the dynamic range of the respective image.

The image data may include intensity values from many sensor pixels of an RGB-IR camera, including intensity values from red (R) sensor pixels, green (G) sensor pixels, blue (B) sensor pixels and infrared (IR) sensor pixels. The image data may include color information (e.g., from R, G, B sensor pixels) and/or monochromatic information (e.g., from IR sensor pixels), and may correspond to a still image (e.g., photograph), an image in a sequence of images (e.g., frames of a video), or a combination thereof. In embodiments, the image data includes a histogram for an image. A hardware component (not shown) may generate a histogram of the red, green, blue and IR channels for a generated image. Entries in the histogram may have discretized values (e.g., discretized into 256 different values in one embodiment). In one embodiment, there are more possible values (e.g., higher resolution for the histogram) for lower signals than for higher signals.

In some embodiments, controller 118 can transmit the image generated based on the image data and/or the image data to an image processing system. The image processing system can be configured to analyze the generated image and image data and determine one or more actions to be performed at the system based on the analysis. Further details regarding the image processing system are described with respect to FIG. 4. In some embodiments, controller 118 can transmit the generated image and/or the image data via connection 122. Connection 122 can include a network connection (e.g., a public network connection, a private network connection, a wide area network connection, a wired network connection, a wireless network connection, a cellular network connection, etc.) and/or a physical connection (e.g., a bus, etc.), in some embodiments.

In some embodiments, imaging device 110 can include a filter component 120, in some embodiments. Filter component 120 can be configured to reduce an intensity of a portion of light received by the first set of sensor pixels 114 (e.g., reflected light 154) while maintaining at least a minimum intensity of the portion of light received by the second set of sensor pixels 114 (e.g., reflected light 156). A minimum intensity refers to an intensity that satisfies a power consumption condition for a system (e.g., as defined by a specification for the system) and/or a safety compliance condition for the system. In an illustrative example, the minimum intensity of the portion of light received by the second set of sensor pixels 114 is maintained if a portion of filter component 120 that filters an IR portion of light may have a signal-noise-ration (SNR) on the second set of sensor pixels 114 to achieve defined feature detection (e.g., within a key performance indicator target) with a particular IR emitter pulse width under a total dark (or almost total dark) environment (e.g., in-cabin environment). In an additional or alternative illustrative example, the minimum intensity is further maintained if a portion of the filter component 120 that filters a visible portion of light does not saturate the first set of sensor pixels 114 with a minimum sensor exposure time in a bright (e.g., a day time) environment.

In some embodiments, filter component 120 can include a lens component that includes an optically transparent lens and a filter material deposited on at least one surface of the optically transparent lens. In other or similar embodiments, the optically transparent lens can be composed of the filter material. Filter component 120 can be attached or otherwise disposed in the imaging system 110 such that reflected light 154 and/or reflected light 156 passes through filter component 120 before being received by sensor 112. In other or similar embodiments, filter component 120 can be or otherwise include a coating that is deposited on one or more components of imaging device 110. For example, imaging device 110 can be or otherwise include a camera that includes one or more camera lenses. Filter component 120 can include a coating that is deposited on at least one surface of a camera lens of the camera.

In some embodiments, the material of the filter component 120 can be a neutral density filter. A neutral density filter can be a filter that reduces or modifies the intensity of one or more wavelengths of light (or one or more ranges of wavelengths of light). The neutral density filter can be designed or otherwise configured to reduce or modify the intensity of visible light (e.g., reflected light 154) received by sensor 112 without (or minimally) reducing or modifying the intensity of IR light (e.g., reflected light 156).

In some embodiments, the material of the neutral density filter can have a particular thickness that is selected for its ability to reduce or modify the intensity of the visible light without (or minimally) reducing or modifying the intensity of the IR light. The thickness of the neutral density filter can be determined based on a target ratio of filtering in the visible wavelength region of the electromagnetic spectrum versus the IR region of the electromagnetic spectrum. In one example, Equation 1 below represents the number of photons of visible light received by sensor 112:

$$NP_{vis} = P_{vis} * vis_{pixel_{bandwidth}} * R_{532\,nm} * T_{vis} * LC * ET_{min} * \frac{A}{PE_{532\,nm}}$$

where $NP_{vis}$ represents a number of visible photons of reflected light 154 that reaches each pixel of the first set of pixels 114, $P_{vis}$ represents a power of visible light of light energy 152 transmitted by light source 150, $vis_{pixel_{bandwidth}}$ represents a bandwidth of the most sensitive visible pixel (e.g., the green pixel) of the first set of pixels 114 (e.g., approximately a 110 nm bandwidth), $R_{532nm}$ represents the reflectance visible light off the material of the surface of the object and/or the subject (e.g., subject 130), $T_{vis}$ represents the visible transmission of visible light through a lens of imaging device 110, LC represents an image plane irradiance (e.g., a lens conversion factor) of the lens of imaging device 110, $ET_{min}$ represents an exposure time of sensor 112 to reflected light 154 and/or reflected light 156, A represents an area of the sensor pixel (e.g., a sensor pixel pitch), and $PE_{532nm}$ represents an energy per photon (e.g., at a 532 nm wavelength).

In another example, Equation 2 below represents the number of photons of IR light received by sensor 112:

$$NP_{IR} = \left(P_{IR} * IR_{pixel_{bandwidth}} * \frac{R_{940\,nm} * T_{IR} * LC * ET_{min} * A}{PE_{940\,nm}}\right) + \left(\frac{P_{illumination}}{A_{target}} * \frac{R_{940\,nm} * T_{IR} * LC * ET_{min} * A}{PE_{940\,nm}}\right)$$

where $NP_{IR}$ represents a number of IR photons of reflected light 156 (which can include IR light reflected from light source 150 and/or IR light reflected from IR transmitter 160) that reaches each pixel of the second set of pixels 116 and/or the first set of pixels 114 (e.g., if the first set of pixels 114 are sensitive to IR light as well), $P_{IR}$ represents a power of IR light of light source 150, $IR_{pixel_{bandwidth}}$ represents a bandwidth of the IR pixel of the second set of pixels 116 (e.g., approximately a 5 nm bandwidth), $R_{940nm}$ represents the reflectance of the visible light off the material of the surface of the object and/or the subject (e.g., subject 130), $T_{IR}$ represents the visible transmission of IR light through a lens of imaging device 110, LC represents an image plane irradiance (e.g., a lens conversion factor) of the lens of imaging device 110, $ET_{min}$ represents an exposure time of sensor 112 to reflected light 154 and/or reflected light 156, A represents an area of the sensor pixel (e.g., a sensor pixel pitch), and $PE_{940nm}$ represents an energy per photon (e.g., at a 940 nm wavelength), $P_{illumination}$ represents a power of IR light 162 transmitted from IR emitter 160, and $A_{target}$ represents an active IR illumination area on the object and/or the subject (e.g., subject 130).

As indicated above, Equations 1 and 2 can be used to determine a number of photons that reach each of the first set of sensor pixels 114 and the second set of sensor pixels 116. A number of electrons generated in each pixel of the first set of sensor pixels 114 can be determined based on the number of photons that reach the first set of sensor pixels 114 and a sensor quantum efficiency at the pixels of the first set of sensor pixels 114 that have the lowest pixel bandwidth (e.g., the G pixels). A number of electrons generated in each pixel of the second set of sensor pixels 116 can be determined based on the number of photons that reach the second set of sensor pixels 116 and a sensor quantum efficiency at the IR pixels of the second set of sensor pixels 116. The ratio of electrons generated between visible light and IR light at sensor 112 can be determined based on the determined number of electrons, indicated above. An optimal attenuation strength of the neutral density filter can be determined based on the determined ratio of electrons generated between the visible light and the IR light. The optimal attenuation strength of the neutral density filter can be a strength that modifies the number of generated electrons the same or similar for the visible light and the IR light. In an illustrative embodiment, the optimal attenuation strength of the neutral density filter has a transmission ratio of between 15-16. The thickness of the neutral density filter can correspond to the determined optimal attenuation strength and/or the transmission ratio for the neutral density filter, in some embodiments.

Figure 3:
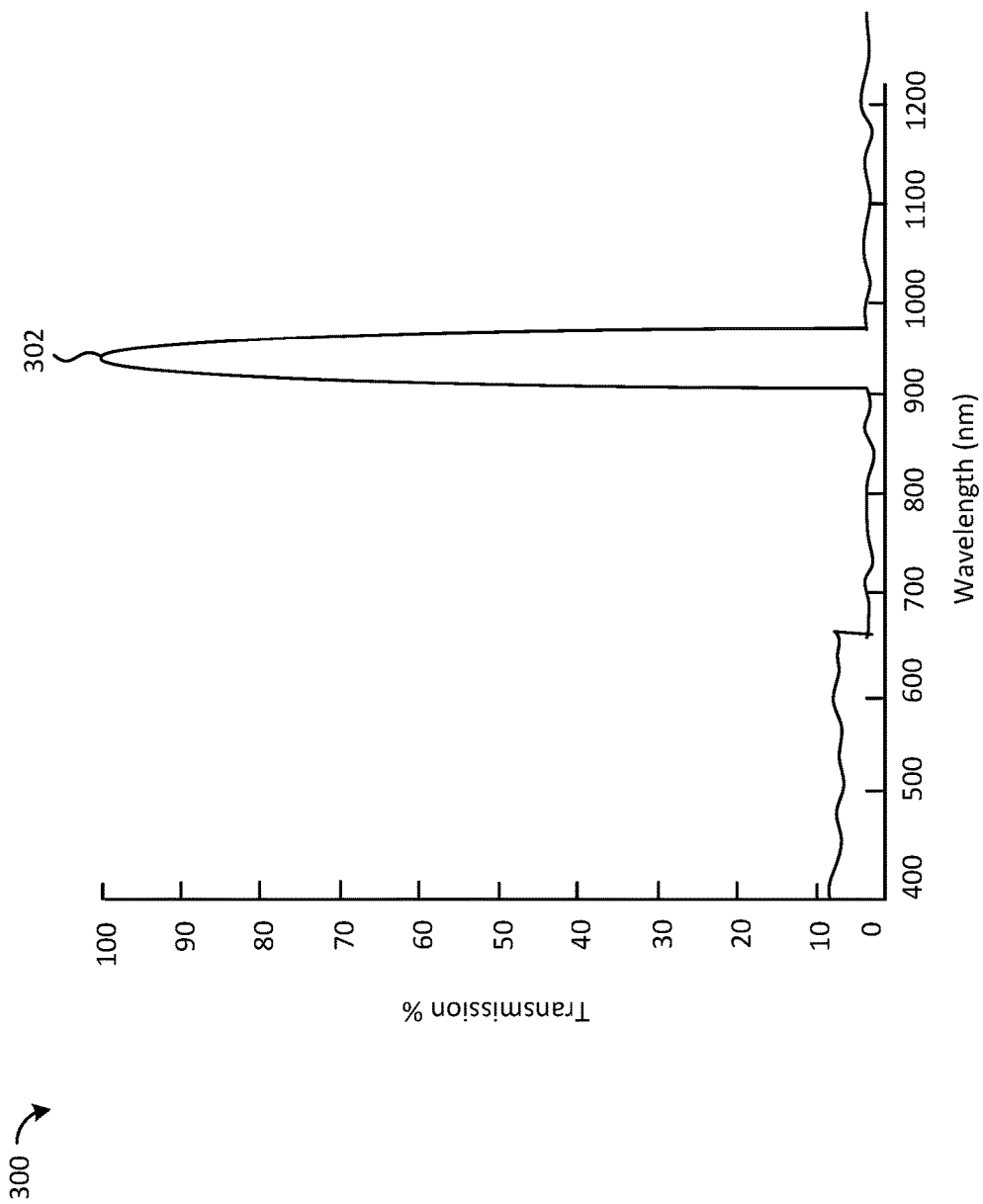
FIG. 3 is a block diagram of an example sensor, controller, and imaging processing system, according to at least one embodiment.

FIG. 3 illustrates example transmission data 300, according to embodiments of the present disclosure. Transmission data 300 can include one or more transmission curves (e.g., curve 302, curve 304) that represent a transmission of light to pixels of sensor 112 through the neutral density filter, as described above. As illustrated in FIG. 3, transmission curve 302, which represents the transmission of IR light through the neutral density filter optimized according to embodiments described above, is at or around 6% at a wavelength of approximately 400 nm to approximately 650 nm. The transmission of IR light through the neutral density filter is at or around 90% at a wavelength of approximately 937 nm to approximately 942 nm and is at approximately less than 1% for the rest of the spectral range.

Referring back to FIG. 1, in other or similar embodiments, the filter component 120 can include a vario-tint filter. A vario-tint filter can include one or more photochromatic dyes that cause the filter to activate or darken when exposed to ultraviolet (UV) rays from sunlight. A thickness and/or a composition of the vario-tint filter can be determined in accordance with previously described embodiments (e.g., the same or similar to the neutral density filter). Filter component 120 can include other types of filters or filter materials, according to embodiments of the present disclosure.

It should be noted that, in some embodiments, imaging device 110 may not include a filter component 120. In some embodiments, one or more of the first set of sensor pixels 114 and/or the second set of sensor pixels 116 can be modified (e.g., by modifying a process recipe associated with fabricating the first set of sensor pixels 114 and/or the second set of sensor pixels 116, by modifying the first set of sensor pixels 114 and/or the second set of sensor pixels 116 after fabrication, etc.) so as to reduce the intensity of the reflected light 154 received by the first set of sensor pixels 114 and maintaining at least a minimum intensity of reflected light 156 received by the second set of sensor pixels 116. In some embodiments, a darker dye can be used to manufacture or otherwise fabricate the first set of sensor pixels 114 than is used according to a process recipe associated with the first set of sensor pixels 114. For example, a darker color filter array (CFA) dye can be used to fabricate the R pixels 212A, the G pixels 212B, and/or the B pixels 212C. In other or similar embodiments, one or more of the first set of sensor pixels 114 can be electrically desensitized. For example, controller 118 (or another processing device coupled to imaging device 110 and/or sensor 112) can turn off a collection capability of a photodiode for the first set of sensor pixels 114 (e.g., by restricting power provided to the photodiode) repeatedly during exposure of the reflected light 154 (and/or any other light of the environment of system 100) to sensor 112. In some instances, the desensitivity of the photodiode for the first set of sensor pixels 114 is dependent on the length of time that the collection capability of the photodiode is turned off for the first set of sensor pixels 114.

In yet other or similar embodiments, the second set of sensor pixels 116 can be modified to have a higher conversion gain (e.g., a measure of a change in output voltage with the absorption of one charge) than a conversion gain of the first set of sensor pixels 114. For example, sensor 112 can be fabricated such that the analogue gain applied to the second set of sensor pixels 116 (e.g., by supporting circuitry of the sensor 112) provides the higher conversion gain to the second set of sensor pixels 116). In yet other or similar embodiments, the second set of sensor pixels 116 can be associated with a different analog gain (e.g., a variable gain amplifier that boosts the voltage output of photodetectors of the imaging device) than an analog gain of the first set of sensor pixels 116.

It should be noted that although some embodiments of the present disclosure are described with respect to a control system and/or a perception system for an automobile (e.g., a vehicle), embodiments of the present disclosure can be applied to any type of system. For example, system 100 and/or component or elements of system 100 (e.g., imaging device 110, sensor 112, controller 118, etc.) can be used or otherwise included in a control system for an autonomous or semi-autonomous machine, a perception system for an autonomous or semi-autonomous machine, a system for performing simulation operations, a system for performing digital twin operations, a system for performing light transport simulation, a system for performing collaborative content creation for three-dimensional (3D) assets, a system for performing deep learning operations, a system implemented using an edge device, a system implemented using a robot, a system for performing conversational AI operations, a system for performing operations using a large language model (LLM), a system for performing synthetic data generation, a system for generating synthetic data, a system for presenting at least one virtual reality content, augmented reality content, or mixed reality content, a system implemented at least partially in a data center, a system implemented at least partially using cloud computing resources, and so forth.

Figure 4:
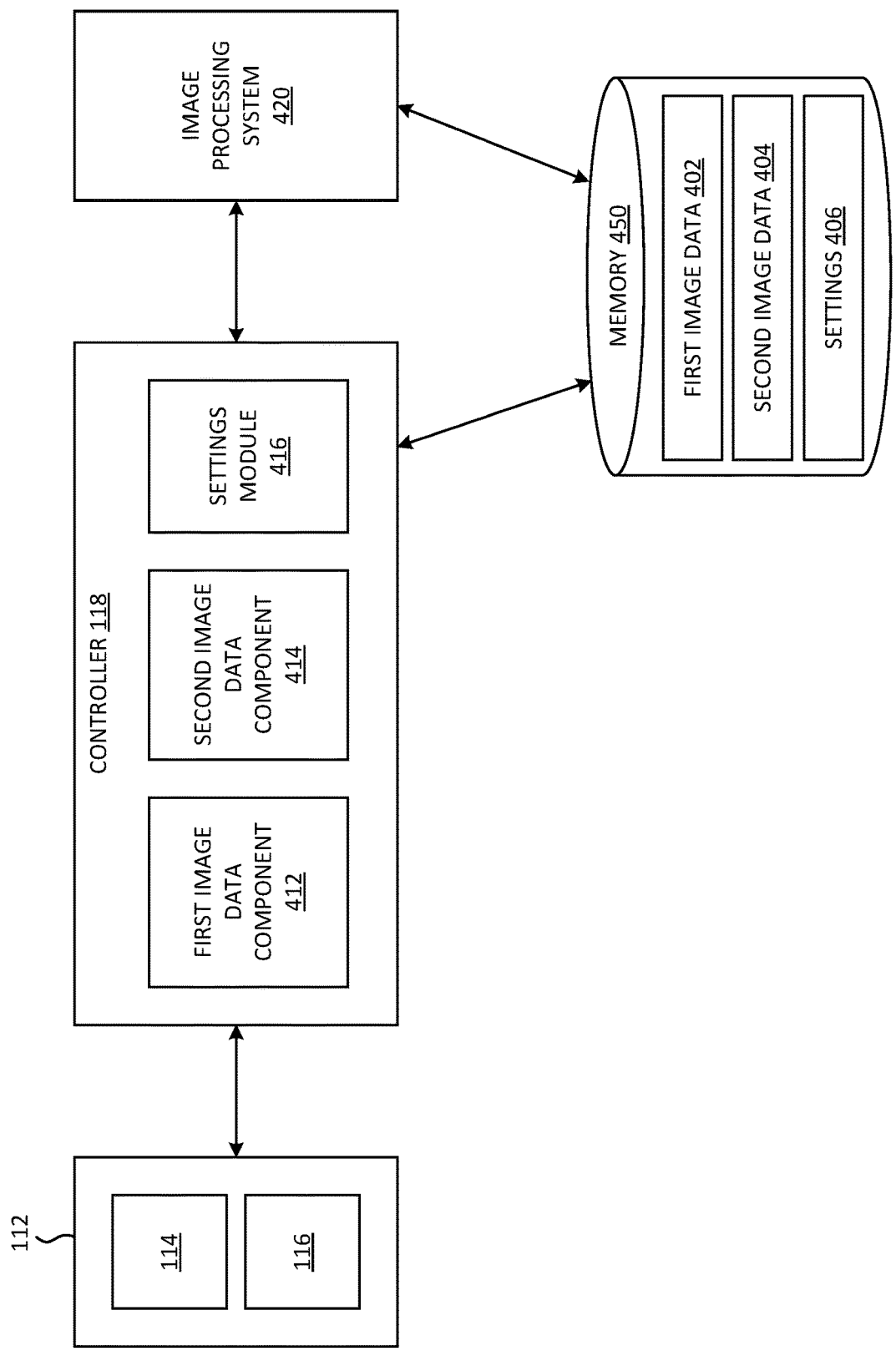
FIG. 4 illustrates a flow diagram of an example method for modifying settings of a sensor, according to at least one embodiment, according to at least one embodiment.

FIG. 4 is a block diagram of an example sensor 112, controller 118, and imaging processing system 420, according to at least one embodiment. Sensor 112 and/or controller 118 can correspond to sensor 112 and/or controller 118 of FIG. 1, as described above. Image processing system 420 can include any system that performs operations on images and/or image data obtained or otherwise generated by imaging device 110 for use in downstream processes (e.g., by image analysis algorithms, machine learning models, output to displays, etc.), as described below. Controller 118 and/or image processing system 420 can be connected or otherwise coupled to memory 450, in some embodiments. Memory 450 can include any volatile or non-volatile memory of system 100 or memory that is otherwise accessible to system 100.

In some embodiments, controller 118 may be configured to obtain image data generated based on light having one or more ranges of wavelengths (e.g., visible light, IR light, etc.). In some embodiments, controller 118 can modify one or more settings associated with sensor 112 and/or imaging device 110 based on the obtained image data. As illustrated in FIG. 4, controller 118 can include a first image data component 412, a second image data component 414, and/or a settings module 416. Further details regarding operations of controller 118 (and/or first image data component 412, second image data component 414, and/or settings module 416) are described herein with respect to FIG. 5.

FIG. 5 illustrates a flow diagram of an example method 500 for modifying settings of a sensor, according to at least one embodiment. In some embodiments, method 500 may be performed by controller 118, imaging processing system 420, some other computing device, or a combination of multiple computing devices. Method 500 may be performed by one or more processing units (e.g., CPUs and/or GPUs), which may include (or communicate with) one or more memory devices. In at least one embodiment, method 500 may be performed by multiple processing threads (e.g., CPU threads and/or GPU threads), each thread executing one or more individual functions, routines, subroutines, or operations of the method. In at least one embodiment, processing threads implementing method 500 may be synchronized (e.g., using semaphores, critical sections, and/or other thread synchronization mechanisms). Alternatively, processing threads implementing method 500 may be executed asynchronously with respect to each other. Various operations of method 500 may be performed in a different order compared with the order shown in FIG. 5. Some operations of the methods may be performed concurrently with other operations. In at least one embodiment, one or more operations shown in FIG. 5 may not always be performed.

At block 510, processing logic obtains first image data depicting one or more objects in an environment. The first image data can be generated based on light received by a first set of sensor pixels. First image data component 412 of controller 118 can receive the first image data from sensor 112, in some embodiments. First image data component 412 can store the received image data as first image data 402 at memory 450. In some embodiments, first image data 402 can be generated based on light received by first set of sensor pixels 114, as described above. The light received by the first set of sensor pixels 114 can have wavelengths in the visible light spectrum (e.g., the color spectrum), as described above.

At block 512, processing logic obtains second image data depicting one or more objects in the environment. The second image data can be generated based on light received by the second set of sensor pixels. Second image data component 414 of controller 118 can receive the second image data from sensor 112, in some embodiments. Second image data component 414 can store the received image data at memory 450 as second image data 404. In some embodiments, second image data 404 can be generated based on light received by second set of sensor pixels 116, as described above. The light received by the second set of sensor pixels 114 can have wavelengths in the IR spectrum, as described above.

In some embodiments, the first set of sensor pixels 114 and/or the second set of sensor pixels 116 may be modified such to reduce the intensity of the light (e.g., the light in the color spectrum) received at the first set of sensor pixels 114 while maintaining a minimum intensity of the light (e.g., the light in the IR spectrum) received at the second set of sensor pixels 116. Modifications can include darker dyes used to fabricate the first set of sensor pixels 114, electrical desensitization of the first set of sensor pixels 114, providing a higher conversion gain of the second set of sensor pixels 116, and so forth, as described above. In other or similar embodiments, a filter component 120 of imaging device 110 can reduce the intensity of the light received at the first set of sensor pixels 114 while maintaining the minimum intensity of the light received at the second set of sensor pixels 116, as described herein.

At block 514, processing logic modifies one or more settings associated with a sensor including the first set of sensor pixels and the second set of sensor pixels from a first exposure time to a second exposure time based on the obtained first image data and the obtained second image data. Settings module 416 of controller 118 can modify the one or more settings 406 associated with sensor 112, in some embodiments. In some embodiments, settings module 416 can modify the settings 406 associated with sensor 112 by increasing the exposure time of the sensor 112. In an illustrative example, setting module 416 can access first image data 402 and second image data 404 (e.g., at memory 450, from first image data component 412 and/or second image data component 414, etc.). Settings module 416 can determine, based on the first image data 402 and the second image data 404, that an intensity of the light (e.g., reflected light 154, reflected light 156, etc.) falls below a threshold intensity associated with the second set of pixels 116. The threshold intensity can be provided to controller 118 (e.g., by a developer or operator of imaging device 110, etc.) and/or can be determined by controller 118 (e.g., by historical data collected by imaging device 110). Settings module 416 can accordingly determine to increase the exposure time of sensor 112 (e.g., to a time such to cause the intensity of the light to meet or exceed the threshold intensity. The increased exposure time of sensor 112 can improve detection of IR light by the second set of sensor pixels 116. Filter component 120 and/or the modifications to the first set of sensor pixels 114 can prevent the increased intensity of the light received by sensor 112 from impacting the quality of images generated based on first image data 402, in some embodiments.

As indicated above, image processing system 420 can use image data (e.g., first image data 402, second image data 404), and/or images generated based on first image data 402 and/or second image data 404 for downstream processes of system 100. As described above, system 100 can be (or can be included at) a driver monitoring system (DMS) and/or an occupant monitoring system (OMS), in some embodiments. In such embodiments, image processing system 420 can process images generated based on first image data 402 and/or second image data 404 for use in the driver monitoring system and/or the occupant monitoring system. For example, image processing system 420 can provide the first image data 402 and/or the second image data 404 (and/or images generated based on first image data 402 and/or second image data 404) as input to a trained machine learning model. The trained machine learning model may be, for example, an artificial neural network, a support vector machine, a random forest algorithm, a decision tree, a Hidden Markov Model (HMM), Gaussian Mixture Model (GMM), a regression model, or other type of machine learning model. The machine learning model may be trained to generate an output that is a prediction, a classification, an estimation, etc. The output may include a confidence rating, and the confidence rating (and accuracy) of the machine learning model may be maximized due to improved collection of image data, as described herein, prior to input into the trained machine learning model.

In the example of a DMS, the machine learning model may output an activity classification for an activity of a driver for an automobile (e.g., indicating whether a driver's hands are on a steering wheel), an attention classification or attention level determination for the driver (e.g., indicating whether a driver's eyes are on the road), and so on. In the example of an OMS, the machine learning model may output an indication that one or more occupants are detected. This may be used to alert the driver of an infant in a rear seat, for example, when the driver turns off the automobile.

One type of machine learning model that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes; and the fourth layer may output a classification or prediction, for example. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In one embodiment, one or more machine learning model is a recurrent neural network (RNN). An RNN is a type of neural network that includes a memory to enable the neural network to capture temporal dependencies. An RNN is able to learn input-output mappings that depend on both a current input and past inputs. The RNN will address past and future scans and make predictions based on this continuous scanning information. RNNs may be trained using a training dataset to generate a fixed number of outputs (e.g., to classify time varying data such as video data as belonging to a fixed number of classes). One type of RNN that may be used is a long short term memory (LSTM) neural network.

A common architecture for such tasks is LSTM (Long Short Term Memory). Unfortunately, LSTM is not well suited for images since it does not capture spatial information as well as convolutional networks do. For this purpose, one can utilize ConvLSTM—a variant of LSTM containing a convolution operation inside the LSTM cell. ConvLSTM is a variant of LSTM (Long Short-Term Memory) containing a convolution operation inside the LSTM cell. ConvLSTM replaces matrix multiplication with a convolution operation at each gate in the LSTM cell. By doing so, it captures underlying spatial features by convolution operations in multiple-dimensional data. The main difference between ConvLSTM and LSTM is the number of input dimensions. As LSTM input data is one-dimensional, it is not suitable for spatial sequence data such as video, satellite, radar image data set. ConvLSTM is designed for 3-D data as its input. In one embodiment, a CNN-LSTM machine learning model is used. A CNN-LSTM is an integration of a CNN (Convolutional layers) with an LSTM. First, the CNN part of the model processes the data and a one-dimensional result feeds an LSTM model.

Image processing system 420 can perform one or more actions based on the output of the machine learning model. The action can be, fir example, generating an alert if a driver's attention is not on the road, generating an alert as a driver exits a car that there is a child in a back seat of the car, and so on.

In other or similar embodiments, first image data 402 and/or second image data 404 can be used (e.g., by image processing system 420) to display an image (e.g., to a driver or an occupant of an automobile, etc.). In some embodiments, image processing system 420 can receive one or more images generated based on first image data 402 and/or second image data 404. Image processing system 420 can output the image to a display. In one example, an RGB-IR camera may be an in-cabin camera that generates images of an automobile's occupants. The cabin may include a monitor, and the transformed image may be output to the monitor. For example, an image may be output to a display in a car's dashboard showing an image of an interior of the car. The image may be a full resolution image regardless of lighting, and may be a color image when there is ambient visible light (e.g., during the day) and a monochrome image when there is no or little ambient visible light (e.g., at night).

Figure 6A:
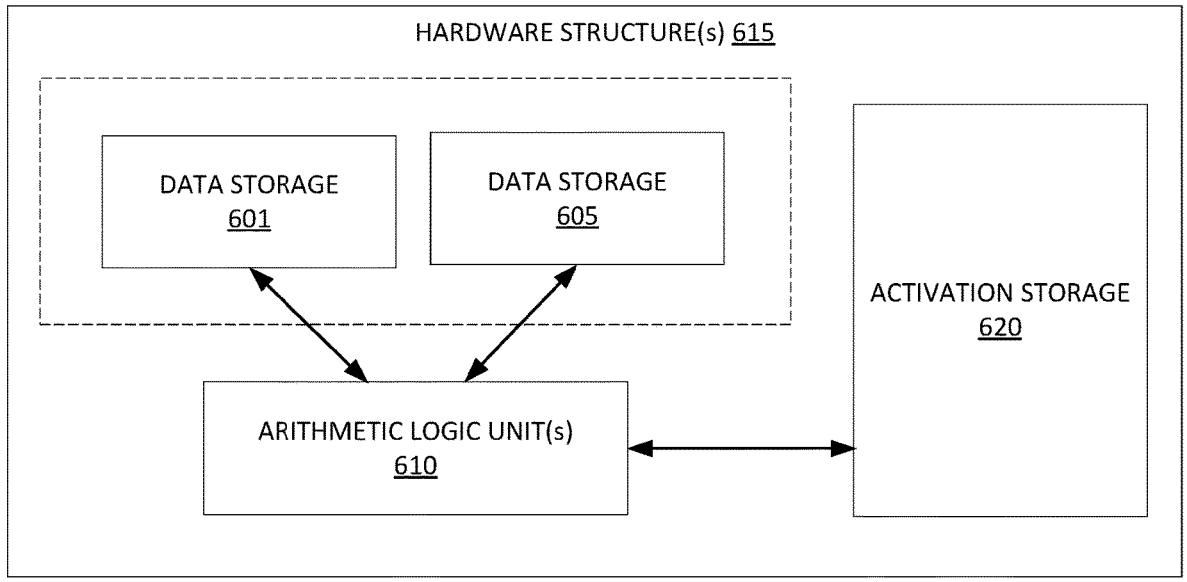
FIG. 6A illustrates inference and/or training logic, according to at least one embodiment.

FIG. 6A illustrates hardware structure(s) 615 for inference and/or training logic used to perform inferencing and/or training operations associated with one or more embodiments. Details regarding inference and/or training logic are provided below in conjunction with FIGS. 6A and/or 6B.

In at least one embodiment, hardware structure(s) 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic may include, or be coupled to code and/or data storage 601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, hardware structure(s) 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 code and/or data storage 605 may be included with other on-chip or off-chip data storage, including a processor's L1, L2, or L3 cache or system memory.

In at least one embodiment, hardware structure(s) 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, hardware structure(s) 615 and/or inference and/or training logic illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, hardware structure(s) and/or inference and/or training logic of FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
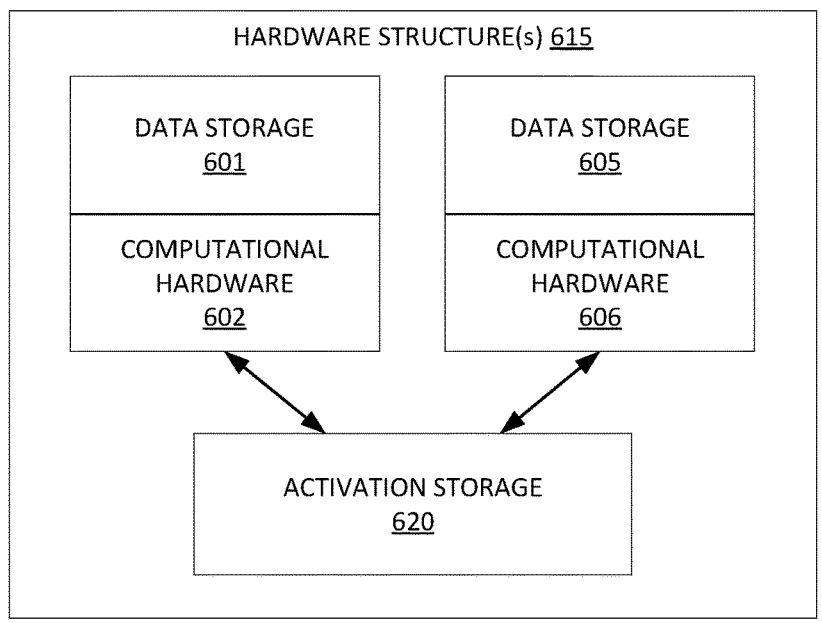
FIG. 6B illustrates inference and/or training logic, according to at least one embodiment.

FIG. 6B illustrates hardware structure(s) 615 for inference and/or training logic, according to at least one or more embodiments. In at least one embodiment, hardware structure(s) 615 may include, without limitation, hardware logic in which computational resources are dedicated or otherwise exclusively used in conjunction with weight values or other information corresponding to one or more layers of neurons within a neural network. In at least one embodiment, hardware structure(s) 615 and/or inference and/or training logic of FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, hardware structure(s) 615 and/or inference and/or training logic of FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic.

Figure 7:
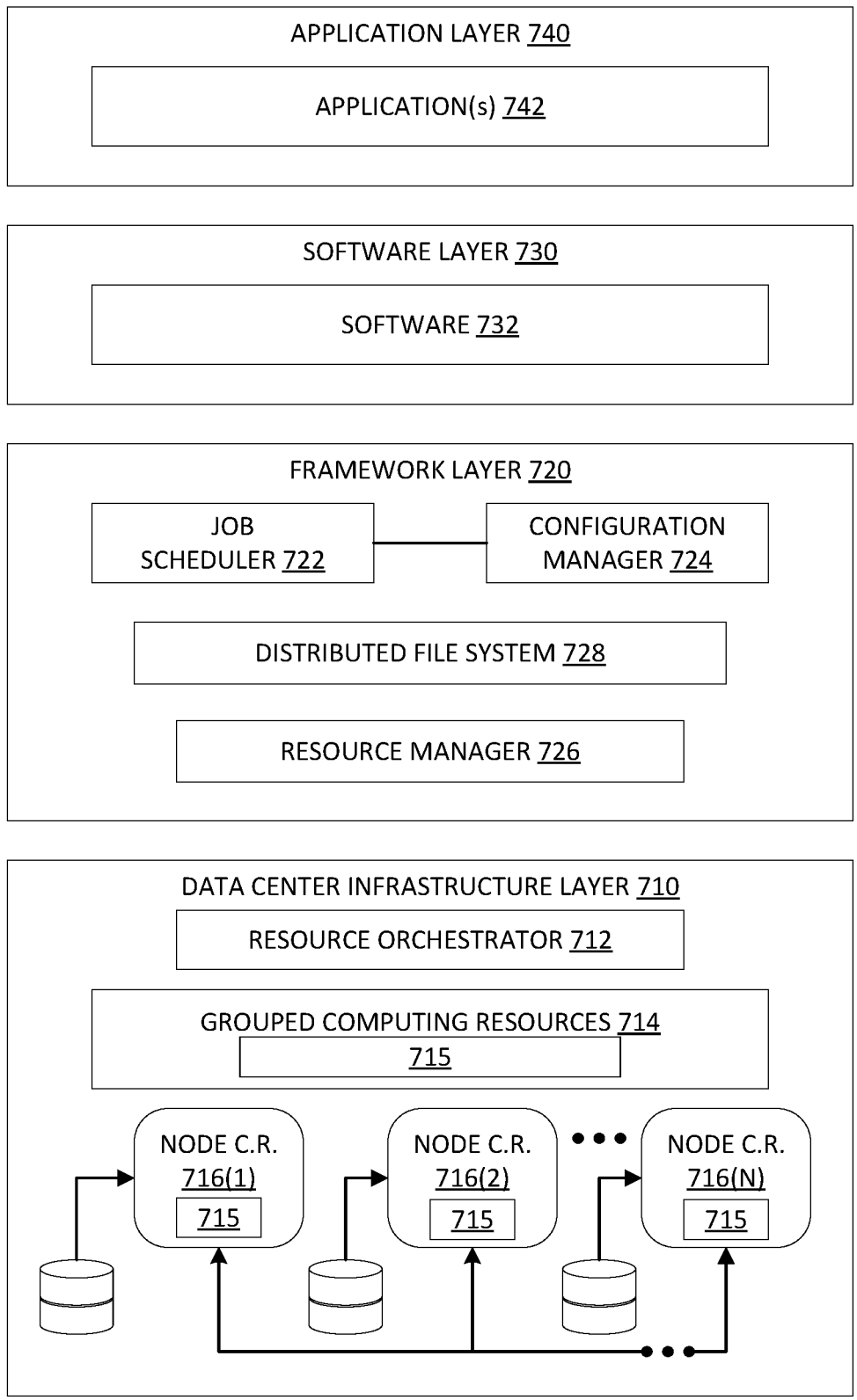
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 1240.

In at least one embodiment, as shown in FIG. 7, data center infrastructure layer 710 may include a resource orchestrator 712, grouped computing resources 714, and node computing resources ("node C.R.s") 616(1)-616-(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 616(1)-616(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 616(1)-616(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 616(1)-616(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic are used to perform inferencing and/or training operations associated with one or more embodiments. Details regarding inference and/or training logic are provided in conjunction with FIGS. 6A and/or 6B. In at least one embodiment, inference and/or training logic may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
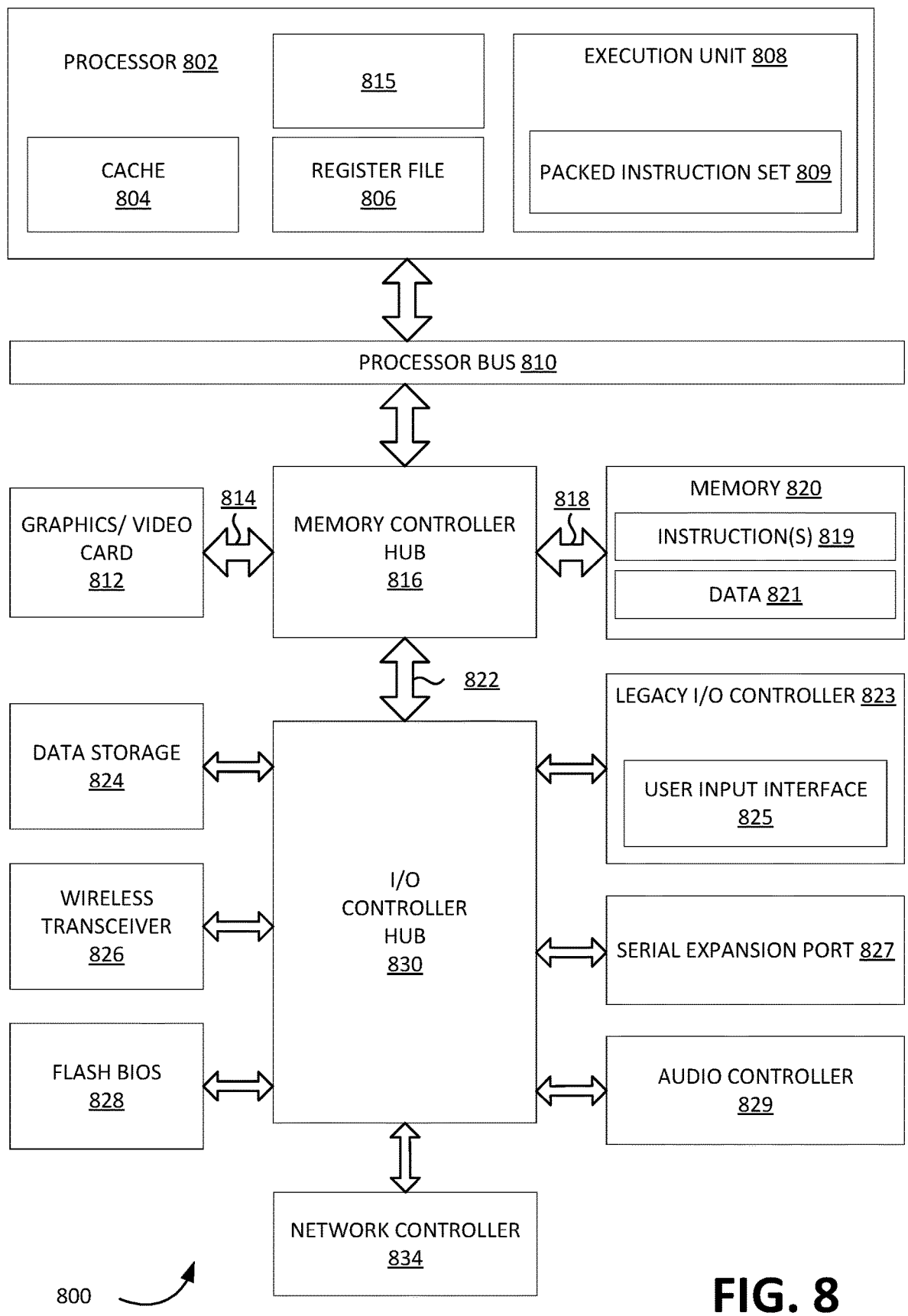
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips," whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
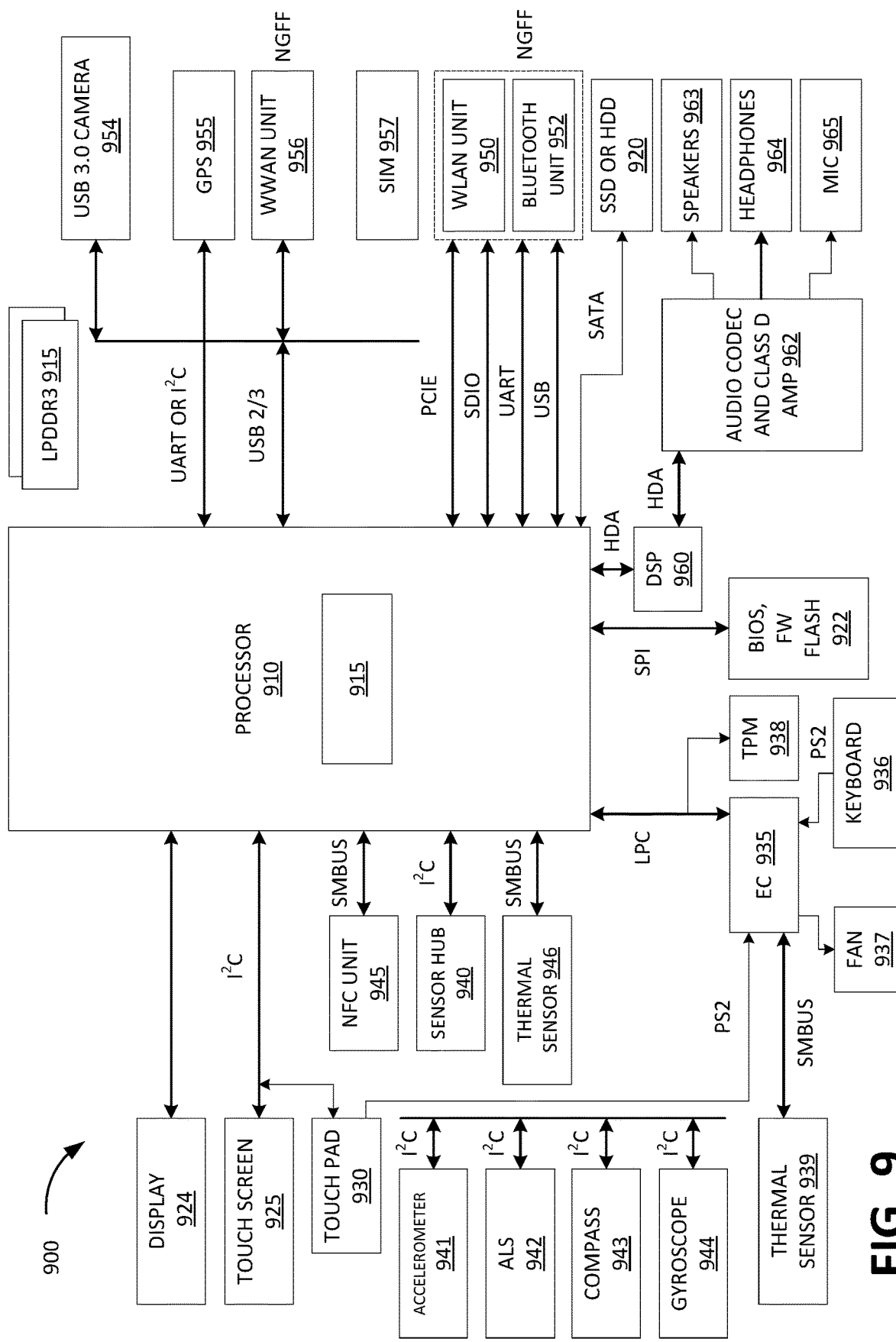
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips," whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
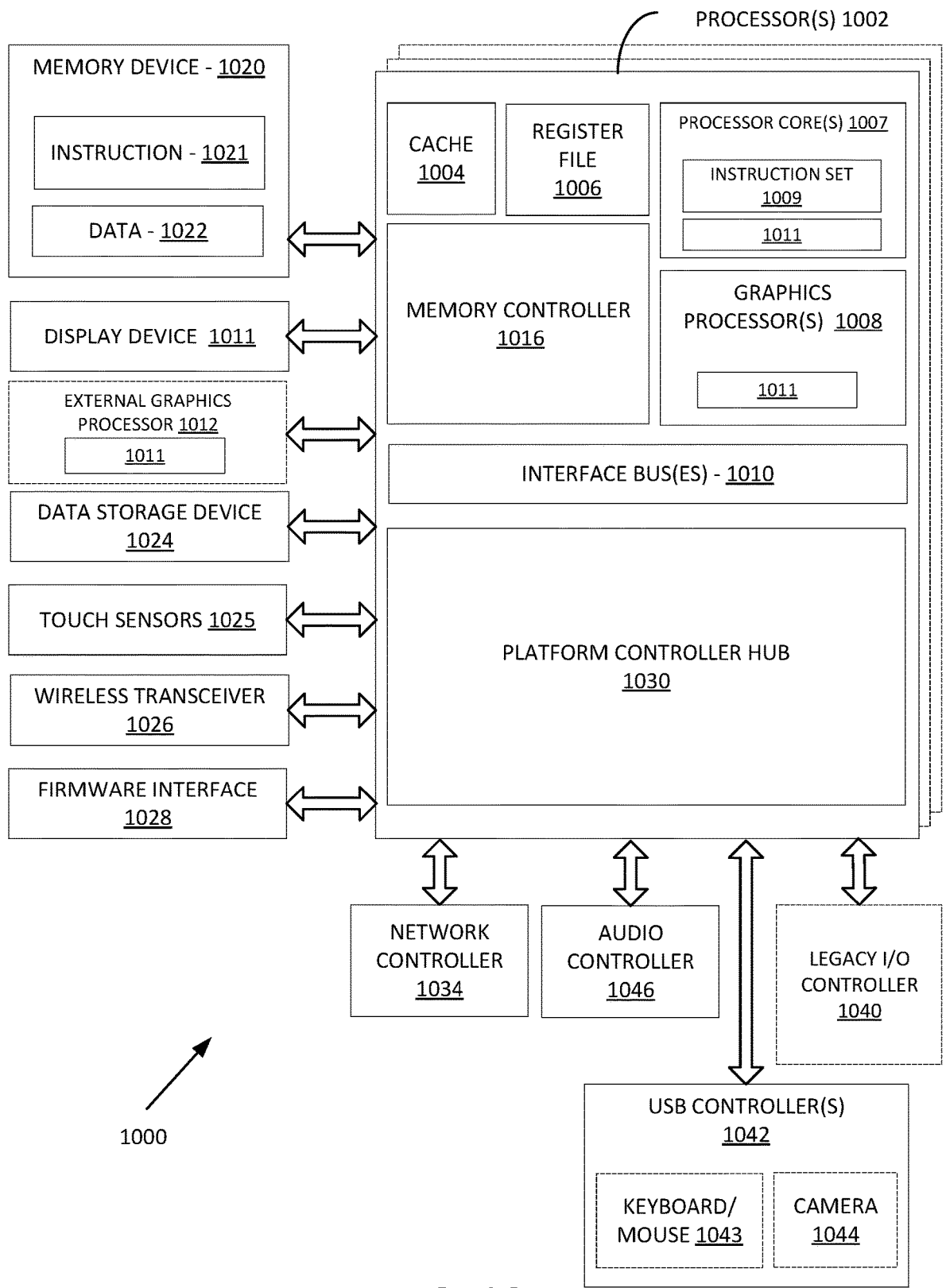
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and may be, for example, a unified extensible firmware interface (UEFI). In at least one embodiment, network controller 1034 may enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1011. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1008. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
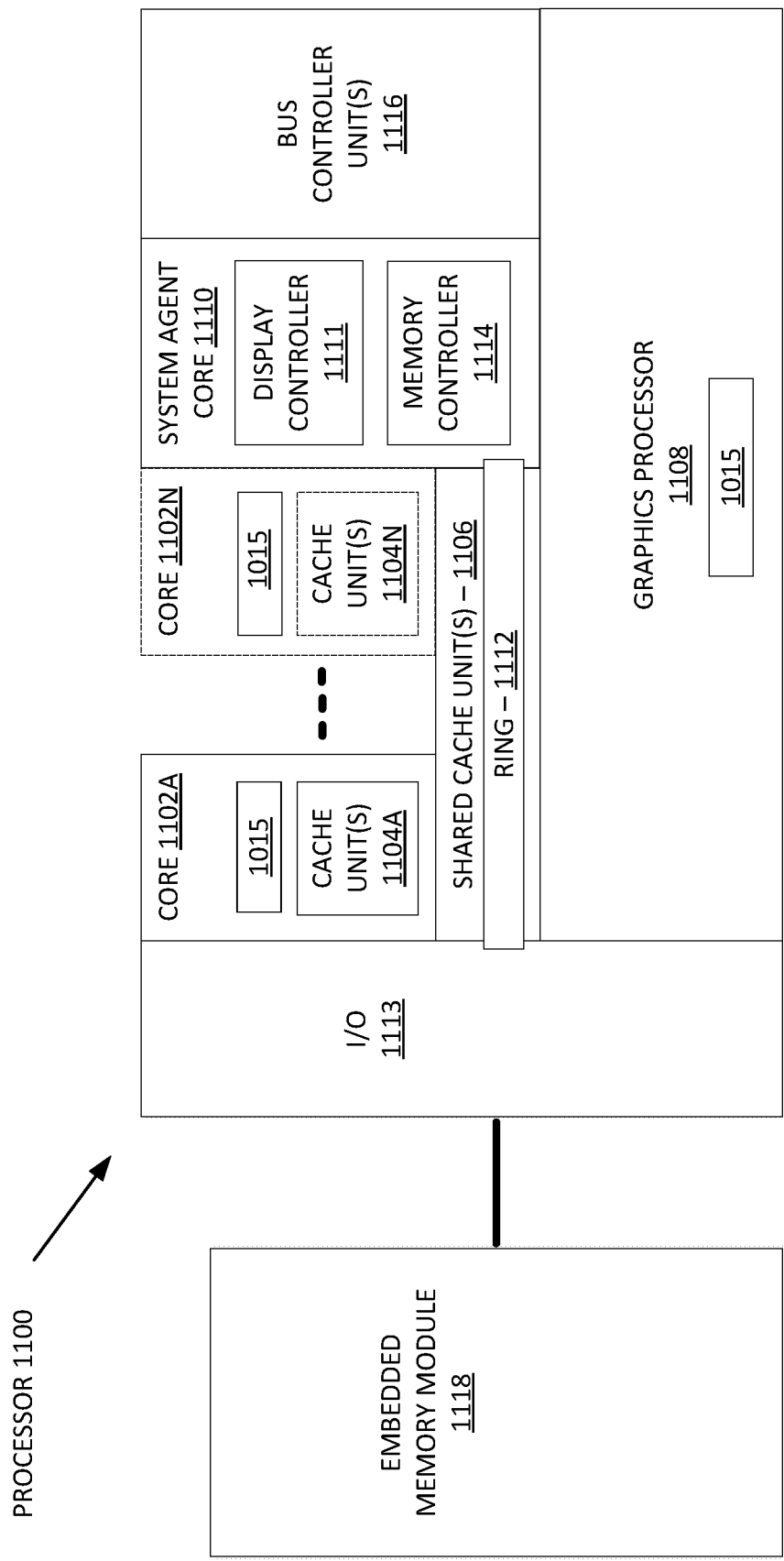
FIG. 11 illustrates at least portions of a graphics processor, according to one or more embodiments.

FIG. 11 is a block diagram of a processor 1100 having one or more processor cores 1102A-1102N, an integrated memory controller 1113, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1113 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1113. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as a SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 12:
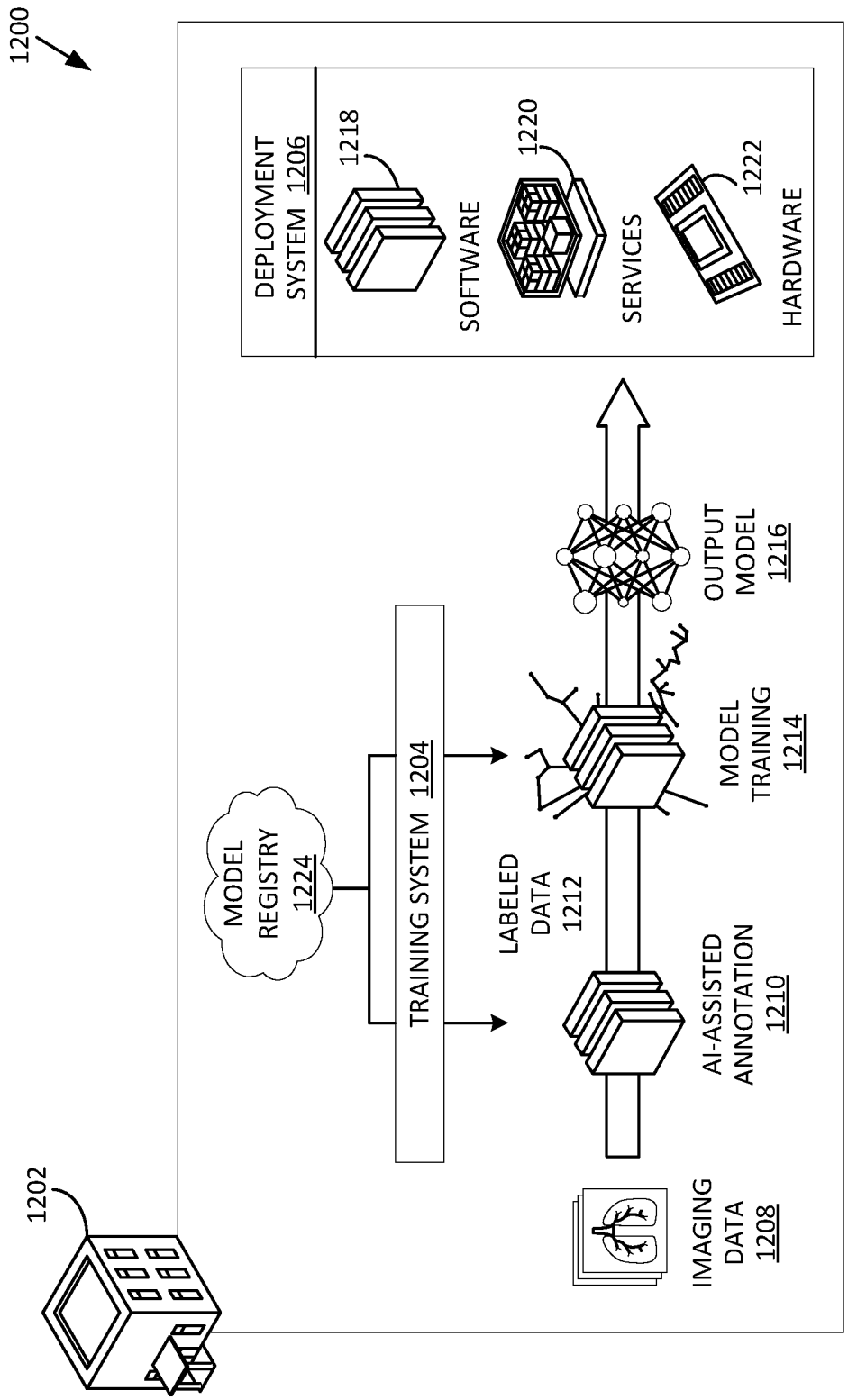
FIG. 12 is an example data flow diagram for an advanced computing pipeline, in accordance with at least one embodiment.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility(ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1204 (FIG. 12) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1204 (FIG. 12) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224—and referred to as output model 1216—and may be used in deployment system 1206 to perform one or more processing tasks for one or more applications of a deployment system.

In at least one embodiment, training pipeline 1204 (FIG. 12), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1200 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1200 of FIG. 12). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1230 (FIG. 12)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 13:
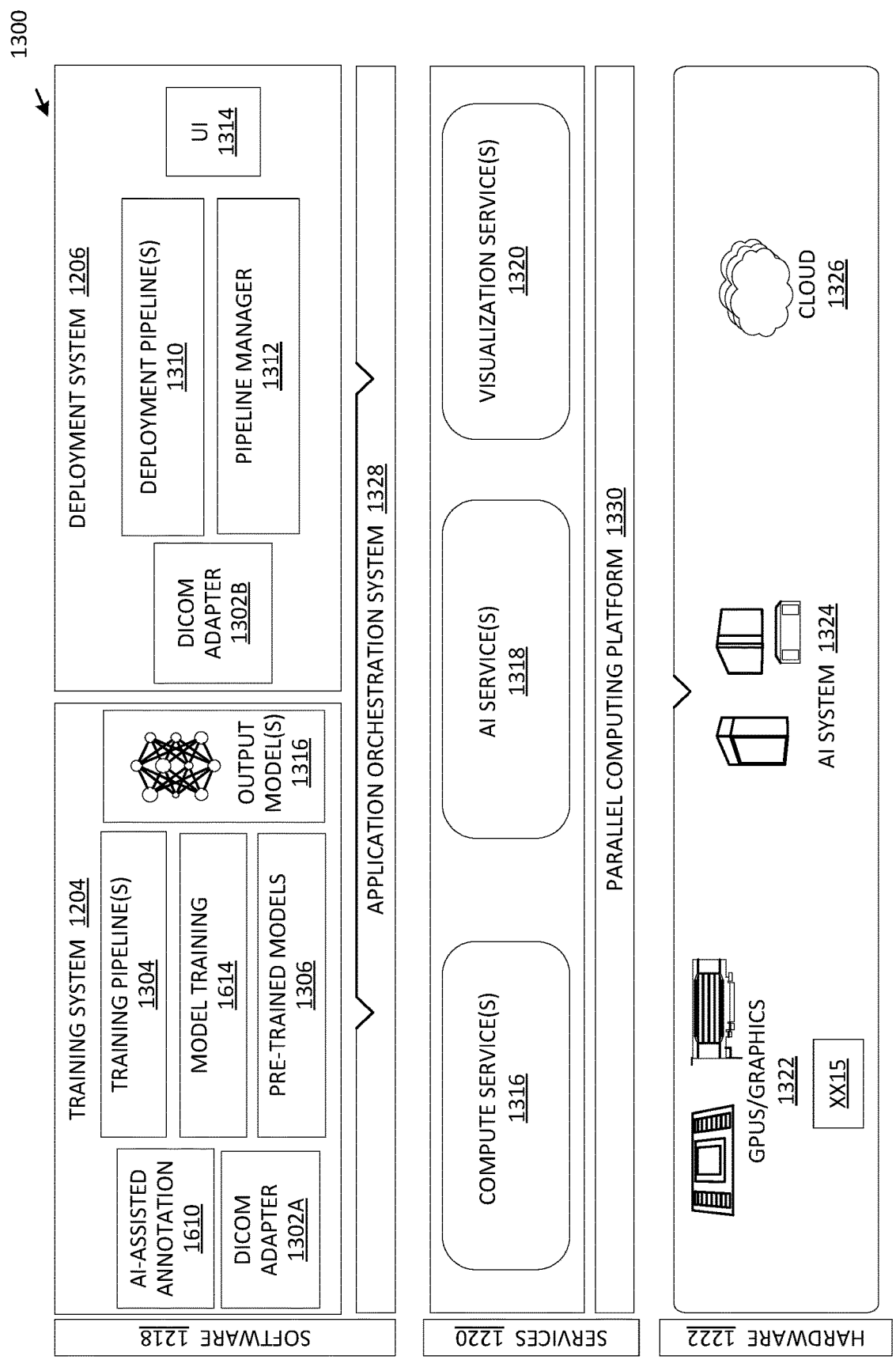
FIG. 13 is a system diagram for an example system for training, adapting, instantiating and deploying machine learning models in an advanced computing pipeline, in accordance with at least one embodiment.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g., pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1304 may include AI-assisted annotation, as described in more detail herein with respect to at least FIG. 12B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MRI machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300—such as services 1220 and hardware 1222—deployment pipelines 1310 may be even more user friendly, provide for easier integration, and produce more accurate, efficient, and timely results. One or more embodiments of the application may be implemented as, or to include a game, a video streaming application, a machine control application, a machine locomotion application, a machine driving application, a synthetic data generation application, a model training application, a perception application, an augmented reality application, a virtual reality application, a mixed reality application, a robotics application, a security and surveillance application, an autonomous or semi-autonomous machine application, a deep learning application, an environment simulation application, a data center processing application, a conversational AI application, a light transport simulation application (e.g., ray tracing, path tracing, etc.), a collaborative content creation application for 3D assets, a digital twin system application, a cloud computing application and/or another type of application or service.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may enable general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline(s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<12 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1606. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326—or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to enable seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

Figure 14A:
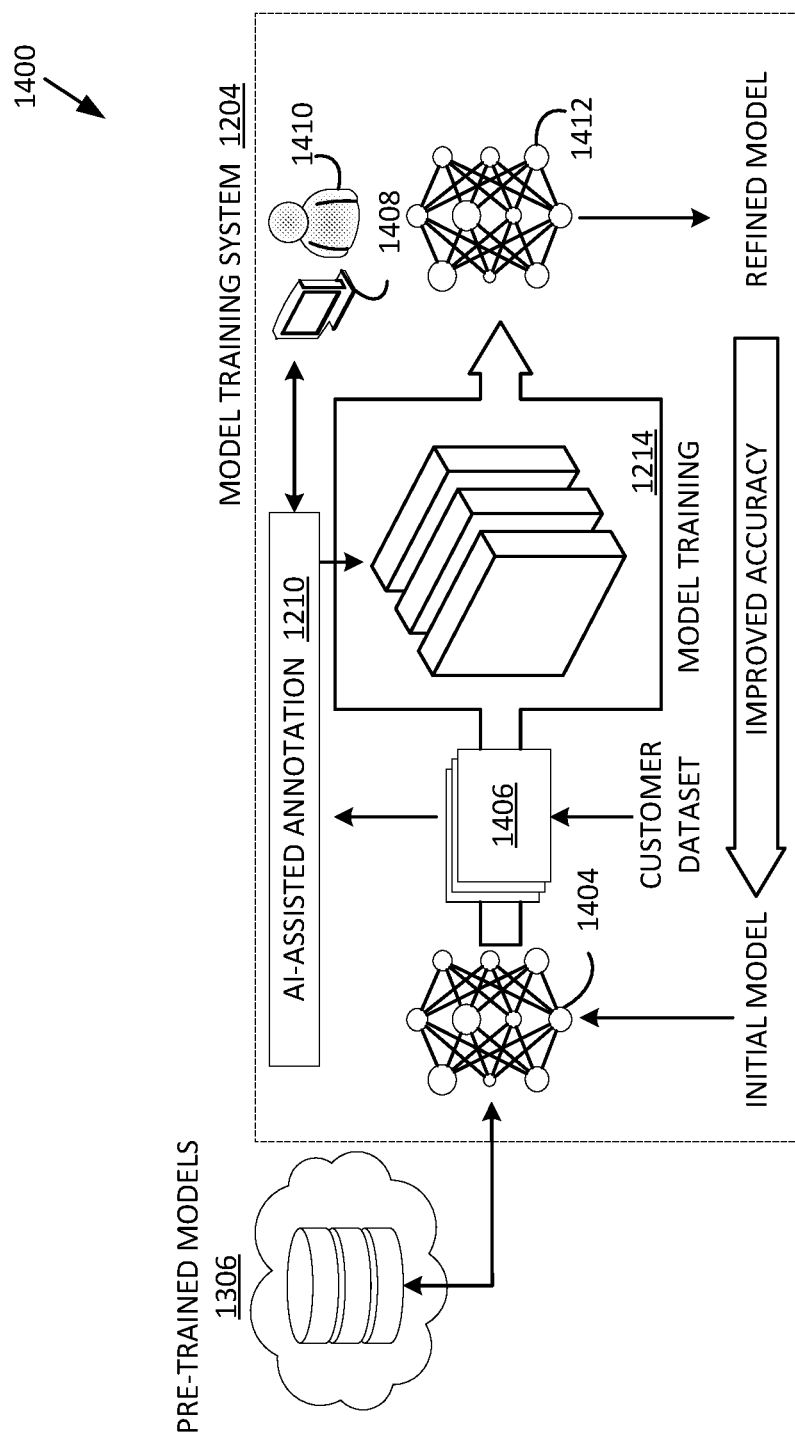
FIGS. 14A and 14B illustrate a data flow diagram for a process to train a machine learning model, as well as client-server architecture to enhance annotation tools with pre-trained annotation models, in accordance with at least one embodiment.

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto)annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1210 at a facility for performing one or more processing tasks with respect to medical imaging data.

In at least one embodiment, refined model 1412 may be uploaded to pre-trained models 1206 in model registry 1224 to be selected by another facility. In at least one embodiment, his process may be completed at any number of facilities such that refined model 1412 may be further refined on new datasets any number of times to generate a more universal model.

Figure 14B:
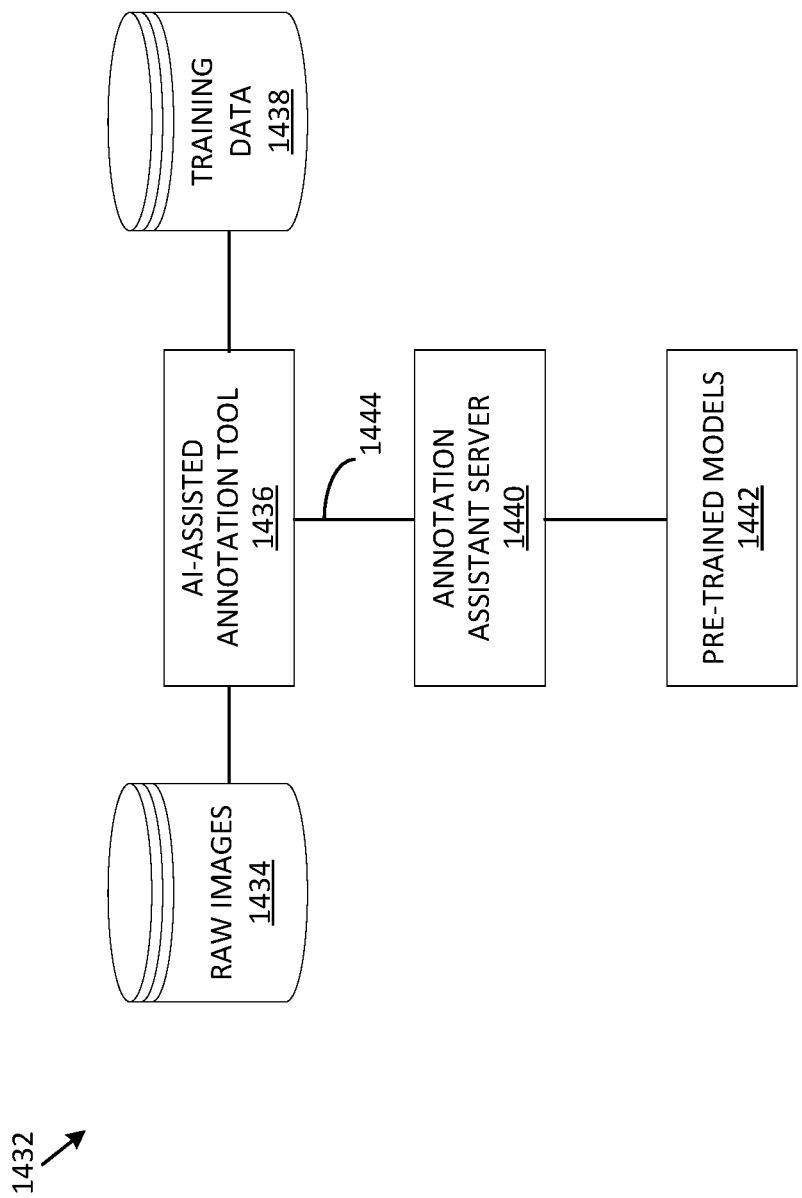

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
   a sensor to receive light reflected off one or more objects in an environment, the sensor comprising:
   a first set of sensor pixels to detect a portion of the received light having wavelengths in a visible light spectrum; and
   a second set of sensor pixels to detect an additional portion of the received light having wavelengths in an infrared (IR) spectrum;
   one or more lenses, wherein at least one of the one or more lenses or a coating on at least one of the one or more lenses is composed of a filter material to reduce an intensity of the portion of the received light detected by the first set of sensor pixels while maintaining at least a minimum intensity of the received light detected by the second set of sensor pixels; and
   a controller to modify an exposure time associated with receiving the reflected light by the sensor, and to adjust an amount of power supplied to a photodiode of the first set of sensor pixels for a duration corresponding to at least a portion of the modified exposure time.

2. The system of claim 1, wherein the filter material comprises one or more of a neutral density filter material or a vario-tint filter material.

3. The system of claim 1, wherein the sensor is a component of a camera, and the one or more lenses comprise a camera lens.

4. The system of claim 3, wherein the camera is to:
   generate first image data depicting the one or more objects in the environment based on the portion of the received light detected by the first set of sensor pixels; and
   generate second image data depicting the one or more objects in the environment based on the additional portion of the received light detected by the second set of sensor pixels,
   wherein the first image data satisfies one or more minimum visible light image data criteria.

5. The system of claim 1, further comprising:
   an IR emitter to transmit a portion of the light in the IR spectrum towards the one or more objects in an environment.

6. The system of claim 5, further comprising:
   a controller, wherein the controller to:
   modify an exposure time associated with receiving the reflected light by the sensor.

7. The system of claim 6, wherein to modify the exposure time associated with receiving the reflected light by the sensor, the controller is to:
   modify one or more settings associated with the sensor to increase the exposure time associated with the first set of sensor pixels from a first exposure time to a second exposure time based on an intensity of the portion of the light in the IR spectrum transmitted by the IR emitter.

8. The system of claim 6, wherein the controller is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for three-dimensional (3D) assets;
- a system for performing deep learning operations;
- a system implemented using an edge device;
- a system implemented using a robot;
- a system for performing conversational AI operations;
- a system for performing operations using a large language model (LLM);
- a system for performing synthetic data generation;
- a system for generating synthetic data;
- a system for presenting at least one of virtual reality content, augmented reality content, or mixed reality content;
- a system implemented at least partially in a data center; or
- a system implemented at least partially using cloud computing resources.

9. The system of claim 1, wherein the first set of sensor pixels comprise pixels of at least one of a red-green-blue (RGB) pixel array, a red-green-blue-white (RGBW) array, a cyan-yellow-green-magenta (CYGM) array, a red-clear-green (RCG) array, an IR-clear (IRC) array, an IR-monochrome array, a red-clear-blue (RCB) array, or a red-yellow-blue (RYB) array.

10. An imaging device comprising:
- a sensor to receive light reflected off one or more objects in an environment, a first portion of the received light having wavelengths in a visible spectrum and a second portion of the received light having wavelengths in an infrared (IR) spectrum, wherein the sensor comprises:
  - a first set of sensor pixels to detect the first portion of the received light; and
  - a second set of sensor pixels to detect the second portion of the received light; and
- a controller, wherein the controller is to:
  - increase an exposure time associated with the sensor based on an intensity of the second portion of the received light, wherein the increased exposure time improves detection by the second set of sensor pixels of the second portion of the received light; and
  - adjust an amount of power supplied to a photodiode of the first set of sensor pixels for a duration corresponding to at least a portion of the increased exposure time.

11. The imaging device of claim 10, wherein the first set of sensor pixels are electrically desensitized.

12. The imaging device of claim 10, wherein at least one of the first set of sensor pixels are composed of a color filter array die that is darker than other color filter array dies used to fabricate other sensor pixels that detect visible light.

13. The imaging device of claim 10, wherein the second set of sensor pixels are associated with a higher conversion gain than the first set of sensor pixels.

14. The imaging device of claim 10, wherein the second set of sensor pixels are associated with a different analog gain than an analog gain of the first set of sensor pixels.

15. The imaging device of claim 10, wherein the first set of sensor pixels comprise pixels of at least one of a red-green-blue (RGB) pixel array, a red-green-blue-white (RGBW) array, a cyan-yellow-green-magenta (CYGM) array, a red-clear-green (RCG) array, an IR-clear (IRC) array, an IR-monochrome array, a red-clear-blue (RCB) array, or a red-yellow-blue (RYB) array.

16. A method comprising:
- obtaining, using a controller for an imaging system, first image data depicting one or more objects in an environment, wherein the first image data is generated based at least on light reflected off the one or more objects and received using a first set of sensor pixels of a sensor, wherein the first set of sensor pixels is to detect a portion of light having wavelengths in a visible light spectrum;
- obtaining, using the controller, second image data depicting the one or more objects in the environment, wherein the second image data is generated based at least on the light reflected off the one or more objects and received using a second set of sensor pixels, wherein the second set of sensor pixels is to detect an additional portion of light having wavelengths in an infrared (IR) spectrum; and
- modifying, using the controller and based at least on the obtained first image data and the obtained second image data, one or more settings associated with the sensor to;
  - increase an exposure time associated with the first set of sensor pixels from a first exposure time to a second exposure time based on an intensity of the portion of the light in the IR spectrum, and
  - restrict power to a photodiode of the first set of sensor pixels for a duration corresponding to at least a portion of the increased exposure time.

17. The method of claim 16, further comprising:
causing an IR emitter to transmit a portion of the light in the IR spectrum towards the one or more objects in the environment, wherein the intensity of the portion of the light in the IR spectrum depends at least in part on the light in the IR spectrum transmitted by the IR emitter.

18. The system of claim 1, wherein a thickness of at least one of the one or more lenses or the coating is based on a target ratio of filtering in the visible light spectrum and filtering in the IR spectrum.

19. The system of claim 1, wherein the filter material comprises one or more photochromatic dyes.

20. The method of claim 16, wherein the first set of sensor pixels comprise pixels of at least one of a red-green-blue (RGB) pixel array, a red-green-blue-white (RGBW) array, a cyan-yellow-green-magenta (CYGM) array, a red-clear-green (RCG) array, an IR-clear (IRC) array, an IR-monochrome array, a red-clear-blue (RCB) array, or a red-yellow-blue (RYB) array.

* * * * *